United States Patent [19]

Bourne et al.

[11] Patent Number: 6,057,605

[45] Date of Patent: May 2, 2000

[54] TEMPERATURE CONTROL OF EXHAUST GAS CATALYTIC CONVERTERS IN VEHICLES

[75] Inventors: Carl Charles Bourne, Warwickshire; John Lewis Outram, Leicestershire, both of United Kingdom

[73] Assignee: Rover Group Limited, Warwick, United Kingdom

[21] Appl. No.: 09/109,786

[22] Filed: Jul. 2, 1998

[30] Foreign Application Priority Data

Jul. 5, 1997 [GB] United Kingdom .................. 9714132

[51] Int. Cl.⁷ ....................................... F02N 11/06
[52] U.S. Cl. .................. 290/40 C; 290/40 R; 290/40 A; 290/40 B; 290/40 D; 290/40 F; 290/51
[58] Field of Search .................. 180/65.4, 69.6, 180/16 J; 60/274, 284–289, 300; 290/40 A–40 D

[56] References Cited

U.S. PATENT DOCUMENTS

| | | |
|---|---|---|
| 5,323,868 | 6/1994 | Kawashima ............................ 180/65.4 |
| 5,345,761 | 9/1994 | King et al. ............................ 60/274 |
| 5,545,928 | 8/1996 | Kotani .................................... 290/40 |
| 5,588,498 | 12/1996 | Kitada .................................... 180/65.4 |
| 5,785,137 | 7/1998 | Reuyl .................................... 180/65.2 |
| 5,826,671 | 10/1998 | Nakae et al. ......................... 180/85.2 |
| 5,934,073 | 8/1999 | Gieshoff et al. ..................... 60/320 |

FOREIGN PATENT DOCUMENTS

| | | |
|---|---|---|
| 0511654 | 4/1992 | European Pat. Off. . |
| 0570241 | 5/1993 | European Pat. Off. . |

*Primary Examiner*—Elvin Enad
*Attorney, Agent, or Firm*—Davis and Bujold

[57] ABSTRACT

A vehicle powertrain comprises an internal combustion engine 10 and an electric motor 14 capable of producing driving or braking torque for the vehicle. The exhaust system for the engine 10 includes a catalytic converter 22. A control unit 18 monitors the temperature of the catalytic converter 22 using a sensor 32 and controls the driving or braking torque produced by the electric motor 14 so that the load on the engine produces exhaust gases of a suitable temperature to keep the catalytic converter within its optimum operating temperature range while maintaining the desired total output of torque from the powertrain.

23 Claims, 1 Drawing Sheet

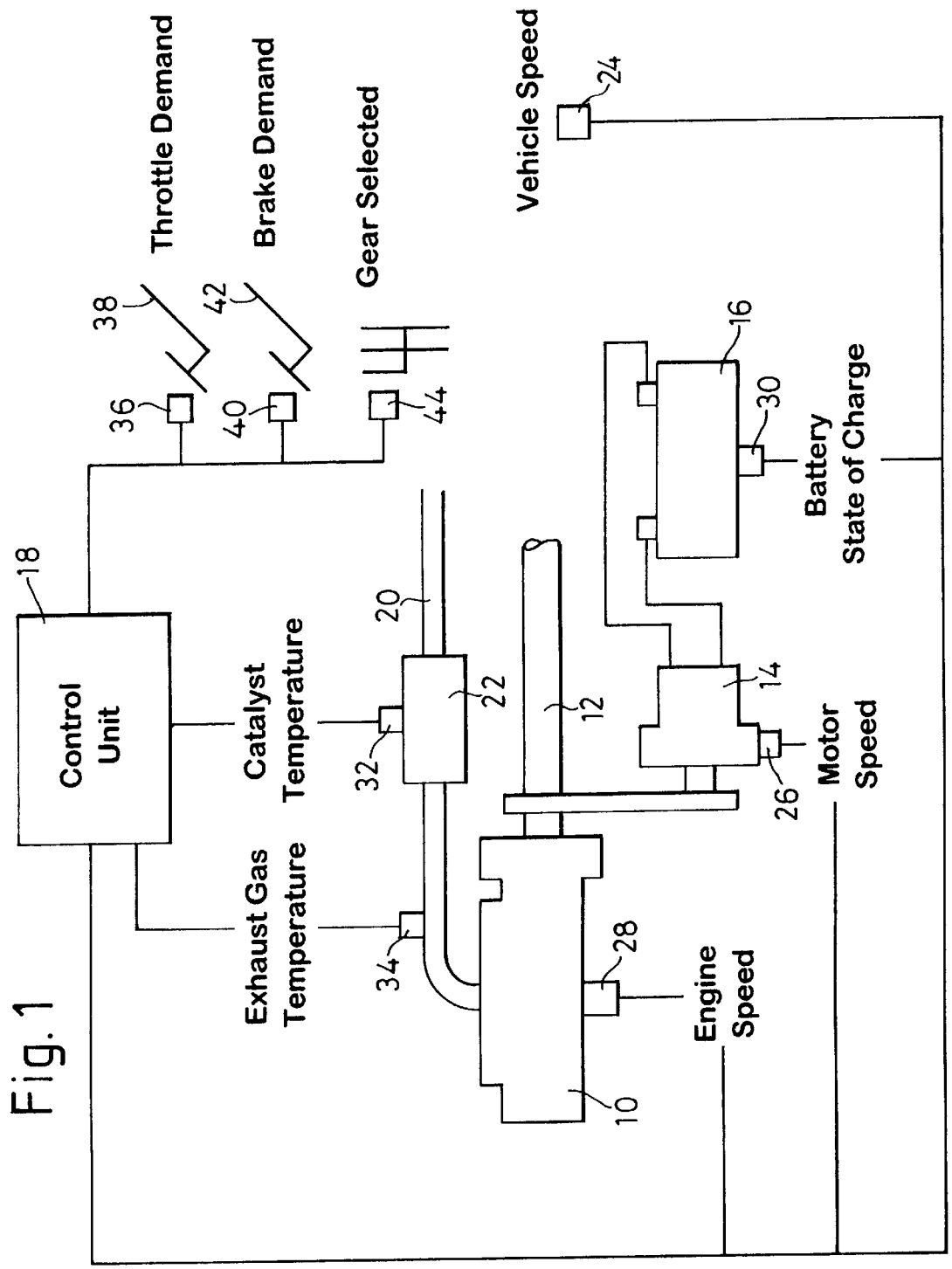

TEMPERATURE CONTROL OF EXHAUST GAS CATALYTIC CONVERTERS IN VEHICLES

FIELD OF THE INVENTION

This invention relates to temperature control of exhaust gas catalytic converters in vehicles and in particular to: a temperature control system for a catalytic converter in a vehicle; and to a method of controlling the temperature of a catalytic converter in a vehicle.

BACKGROUND OF THE INVENTION

The temperature of a catalytic converter is one of the most significant factors which affects its efficiency. The efficiency drops off rapidly at both high and low temperatures, leaving a relatively narrow band of operating temperatures within which efficiency is highest.

One known method of controlling the temperature of a catalytic converter is to provide a heater and one version of such a system is disclosed in EP 0570241.

For hybrid vehicles, the use of a heated catalytic converter is further developed by providing power to the heater from regenerative braking and one such system is known from EP 0511654.

Apart from providing a special heater, one other way of controlling the temperature of a catalytic converter is by controlling the temperature of the exhaust gases passing through it. This is difficult to achieve because the exhaust gas temperature is primarily a function of the load on the engine, which cannot normally be controlled. Factors affecting catalyst performance are particularly important in compression ignition engines, such as diesel engines, where it is difficult to modify fuelling so as to attain optimum conversion efficiency, as is done in spark ignition engines, such as petrol engines.

A further problem with controlling catalytic converter temperatures is that the efficiency of modern engines is increasing, with the result that they produce less waste heat in the exhaust system. This slows down the rate at which catalytic converters can be heated up to a suitable operating temperature and can also mean that the operating temperature is not maintained while the load on the engine is low, for example when it is at idle.

In U.S. Pat. No. 5,545,928 a method of controlling catalytic converter temperature is disclosed for a series hybrid vehicle, which is a type of vehicle comprising an engine which drives an electrical machine and the electrical machine provides all the torque to the driven wheels. The system controls the rate of generation of electrical power to achieve various results, including increasing the temperature of the catalytic converter. In series hybrid vehicles the engine is usually tuned to deliver optimum performance under tightly controlled conditions and it is a problem of this type of arrangement that it is difficult to finely control the rate at which electrical power is generated so as to reduce the load on the engine in order in turn to reduce the temperature of the catalytic converter, without also compromising overall efficiency.

BRIEF DISCUSSION OF THE INVENTION

It is an object of this invention to provide: an improved temperature control system for a catalytic converter in a vehicle; and to provide an improved method of controlling the temperature of a catalytic converter in a vehicle.

According to the present invention there is provided a temperature control system for a catalytic converter in a parallel hybrid vehicle, the system comprising: an engine for producing driving torque for the vehicle; an electrical machine capable of producing driving or braking torque for the vehicle; an exhaust system including treating means for treating exhaust gases from the engine, the efficiency of the treating means being at least partially dependent on the temperature of the exhaust gases; sensing means for sensing the temperature of at least one place in the exhaust system; and control means arranged to monitor the temperature sensed by the sensing means and to control the torque produced by the electrical machine and the engine in response to said sensed temperature so as to control the efficiency of the treating means whilst maintaining the desired output torque from the powertrain, wherein the control means is arranged to temporarily increase the torque produced by the electrical machine if the temperature sensed by the sensing means indicates that the treating means is at a temperature above a desired working temperature so as to temporarily decrease the load on the engine, whereby the temperature of said exhaust gases is lowered in order to cool down the treating means.

The control means may be arranged to temporarily increase the torque produced by the electrical machine by controlling the electrical machine to decrease the braking torque or increase the driving torque it produces.

The system may further comprise an electrical storage battery connected to the electrical machine, wherein the electrical machine may be arranged to draw power from the battery in order to increase the driving torque provided by said electrical machine.

The control means may be arranged to control the electrical machine to temporarily decrease the driving torque or increase the braking torque it produces, if the temperature sensed by the sensing means indicates that the treating means is at a temperature below a desired working temperature, so as to increase the load on the engine, whereby the temperature of said exhaust gases is increased in order to heat up the treating means.

The system may further comprise an electrical storage battery arranged to provide power to a heater of the treating means during a period when the control means has temporarily decreased the driving torque or increased the braking torque produced by the electrical machine, so as to increase the rate at which the treating means is heated up to a rate above the rate which is achieved by an increase in the load alone on the engine.

The electrical machine may comprise an electrical traction motor capable of producing driving and braking torque for the vehicle.

The system may further comprise an electrical storage battery, wherein the electrical machine may be arranged to produce electrical power for recharging the battery when it produces a braking torque for the vehicle.

The control means may have two operating modes, in only one of which the efficiency of the treating means is controlled.

In the other of said modes the torque produced by the engine and the electrical machine may be controlled so as to optimise the fuel efficiency of the powertrain.

The control means may be arranged to switch between said modes in response to changes in at least one driving parameter of the vehicle. The driving parameter may be the speed of the vehicle. The engine may comprise a compression ignition engine.

The invention also provides a method of controlling the temperature of a catalytic converter in a parallel hybrid vehicle, the vehicle comprising: an engine for producing driving torque for the vehicle; an electrical machine capable of producing driving or braking torque for the vehicle; an exhaust system including treating means for treating exhaust gases from the engine, the efficiency of the treating means being at least partially dependent on the temperature of the exhaust gases; sensing means for sensing the temperature of at least one place in the exhaust system; and control means arranged to monitor the temperature sensed by the sensing means and to control the torque produced by the electrical machine and the engine in response to said sensed temperature so as to control the efficiency of the treating means whilst maintaining the desired output torque from the powertrain, the method including temporarily increasing the torque produced by the electrical machine if the temperature sensed by the sensing means indicates that the treating means is at a temperature above a desired working temperature so as to temporarily decrease the load on the engine, whereby the method includes lowering the temperature of said exhaust gases in order to cool down the treating means.

The method may include increasing the torque produced by the electrical machine by controlling the electrical machine to temporarily decrease the braking torque or increase the driving torque it produces.

The vehicle may further comprise an electrical storage battery connected to the electrical machine, and the method may include drawing power from the battery for the electrical machine in order to increase the driving torque provided by said electrical machine.

The method may include decreasing the driving torque or increasing the braking torque that the electrical machine produces, if the temperature sensed by the sensing means indicates that the treating means is at a temperature below a desired working temperature, so as to temporarily increase the load on the engine, whereby the method includes increasing the temperature of said exhaust gases in order to heat up the treating means.

The vehicle may further comprise an electrical storage battery, and the method may include providing power to a heater of the treating means during a period when the control means has temporarily decreased the driving torque or increased the braking torque produced by the electrical machine, so that the method includes increasing the rate at which the treating means is heated up to a rate above the rate which is achieved by an increase in the load alone on the engine.

The vehicle may further comprise an electrical storage battery, and the method may include producing electrical power for recharging the battery when the electrical machine produces a braking torque for the vehicle.

The method may include operating the control means in two operating modes, in only one of which the method includes controlling the efficiency of the treating means.

The method may include controlling the production of torque by the engine and the electrical machine in the other of said modes so as to optimise the fuel efficiency of the powertrain.

The method may include switching between said modes in response to changes in at least one driving parameter of the vehicle and the driving parameter may be the speed of the vehicle.

The invention will now be described by way of example only with reference to the accompanying drawing.

BRIEF DESCRIPTION OF THE DRAWING

FIG. 1 is a schematic representation of a vehicle powertrain which includes a temperature control system for a catalytic converter in accordance with the invention.

DESCRIPTION OF A PREFERRED
EMBODIMENT OF THE INVENTION

Referring to the FIGURE, a parallel hybrid vehicle powertrain comprises an internal combustion engine 10 having an output shaft 12 through which torque is provided to the vehicle wheels via a transmission system, and an electrical machine in the form of an electric traction motor 14 which is coupled to the output shaft 12. The motor 14 is arranged such that it can produce a driving torque for the output shaft 12 whilst powered by a battery 16, or can apply a braking torque to the output shaft 12 and use the electrical power produced by the regenerative braking to recharge the battery 16. The amount of torque produced by each of the engine 10 and the motor 14 and their respective contributions to the overall torque supplied to the output shaft 12 is controlled by a control unit 18, as will be described below.

The engine 10 has an exhaust manifold leading to an exhaust pipe 20, through which exhaust gases are passed into the atmosphere. A catalytic converter 22 is provided in the exhaust pipe 20 such that the exhaust gases will pass through it and thereby pass over catalyst materials which reduce the noxious content of the exhaust gases.

The control unit 18 monitors various parameters of the vehicle by receiving input signals from a number of sensors on the vehicle as follows: a vehicle speed sensor 24 which produces a signal indicative of the ground speed of the vehicle, a motor speed sensor 26 which produces a signal indicative of the speed of the motor 14, an engine speed sensor 28 which produces a signal indicative of the speed of the engine 10, a charge sensor 30 which produces a signal indicative of the state of charge of the battery 16, a catalyst temperature sensor 32 which produces a signal indicative of the temperature of the catalytic converter 22, an exhaust gas temperature sensor 34 which produces a signal indicative of the temperature of the exhaust gas in the exhaust pipe 20, a throttle demand sensor 36 which produces a signal indicative of the position of the accelerator pedal 38 of the vehicle, a brake demand sensor 40 which produces a signal indicative of the position of the brake pedal 42 of the vehicle, and a gear selector sensor 44 which produces a signal indicative of the gear selected in the gearbox of the vehicle.

The control unit 18 has two different modes, urban mode and highway mode, which will be described below. When the vehicle is being driven, the control unit 18 continuously monitors the vehicle speed and operation of the accelerator pedal 38 to determine which of these two modes should be selected. At low speeds and low throttle demands the control unit 18 assumes that the vehicle is being driven in an urban environment, where emissions should preferable be kept low, and operates in urban mode. At high speeds and high throttle demands the control unit 18 assumes that the vehicle is in a non-urban environment and operates in highway mode. In highway mode the control unit 18 operates the engine 10 and motor 14 in known manner so as to optimise the fuel economy of the vehicle. In urban mode the control unit 18 operates so as to ensure that the catalytic converter is maintained at optimum operating temperature as will now be described.

When the vehicle is being driven and the control unit 18 is in urban mode, the control unit 18 monitors the temperature of the catalytic converter 22. If the catalytic converter 22 is within its range of optimum operating temperatures, the control unit 18 continues to control the torque contributions of the engine 10 and motor 14 so as to maximise fuel economy.

If the control unit 18 detects that the temperature of the catalytic converter 22 has dropped below a minimum desirable temperature, the control unit 18 increases the torque output of the engine 10 whilst maintaining the total torque output of the powertrain by increasing the braking torque or decreasing the driving torque provided by the motor 14. The increased torque output, or power, of the engine 10 raises the temperature of the exhaust gases it produces, which in turn heats the catalytic converter 22 above the minimum desirable operating temperature. In addition, or in the alternative, the battery 16 could also be used to provide electrical power to a catalyst heater to boost or fine-tune the warm-up operation, as it would be required to provide less power to the motor 14 during this phase.

If, however, the control unit 18 detects that the temperature of the catalytic converter 22 has risen above a predetermined maximum temperature, the control unit 18 performs a control method which is arranged to reduce the temperature of the catalytic converter 22. The load on the engine 10 is reduced by increasing the torque contribution of the motor 14 or, if the motor is providing a braking torque, by reducing the braking torque. The variation in the contribution of the motor 14 is made subject to the state of charge of the battery not falling below a predetermined minimum level. This method results in lower exhaust gas temperatures and thus reduces the temperature of the catalytic converter 22. The motor 14 is provided with additional power from the battery 16 during this period of catalyst cooling, so that it can provide the additional torque necessary to reduce the engine load.

If the motor 14 is producing a braking torque, the electric energy it produces is stored in the battery 16, thereby recharging it. If the battery 16 becomes fully charged, either the braking torque will be limited or the surplus electric power will be dissipated in some way, such as for example through an electrically powered heat exchanger (not shown).

This invention can be seen to be particularly useful for parallel hybrid vehicles, i.e. vehicles in which an engine and a motor selectively provide torque to the wheels either individually or in parallel. The advantage arises because, when compared to a series vehicle of the type disclosed in U.S. Pat. No. 5,545,928, temperature control of the catalyst can be achieved using only one electrical machine. Greater freedom is therefore provided in the formulation of the catalyst material for optimum conversion efficiency by the improved control over operating temperatures.

What is claimed is:

1. A temperature control system for a catalytic converter in a parallel hybrid vehicle, the system comprising:
   an engine for producing driving torque for the vehicle;
   an electrical machine capable of producing driving or braking torque for the vehicle, said engine and said electrical machine collectively forming a powertrain for the vehicle;
   an exhaust system including treating means for treating exhaust gases from the engine, the efficiency of the treating means being at least partially dependent of the temperature of the exhaust gases;
   sensing means for sensing the temperature of at least one place in the exhaust system; and
   control means arranged to monitor the temperature sensed by the sensing means and to control the torque produced by the electrical machine and the engine in response to said sensed temperature as to control the efficiency of the treating means whilst maintaining the desired output torque from the powertrain, wherein the control means is arranged to temporarily increase the torque produced by the electrical machine if the temperature sensed by the sensing means indicated that the treating means is at a temperature so as to temporarily decrease the load on the engine, such that the temperature of said exhaust gases is lowered in order to maintain the desired output torque from the powertrain despite a cool down of the treating means.

2. A system according to claim 1, wherein the control means is arranged to temporarily increase the torque produced by the electrical machine by controlling the electrical machine to decrease the braking torque or increase the driving torque it produces.

3. A system according to claim 1, further comprising an electrical storage battery connected to the electrical machine, wherein the electrical machine is arranged to draw power from the battery in order to increase the driving torque provided by said electrical machine.

4. A system according to claim 1, wherein the control means is arranged to control the electrical machine to temporarily decrease the driving torque or increase the braking torque it produces, if the temperature sensed by the sensing means indicates that the treating means is at a temperature below a desired working temperature, so as to increase the load on the engine, whereby the temperature of said exhaust gases is increased in order to heat up the treating means.

5. A system according to claim 4, further comprising an electrical storage battery arranged to provide power to a heater of the treating means during a period when the control means has temporarily decreased the driving torque or increased the braking torque produced by the electrical machine, so as to increase the rate at which the treating means is heated up to a rate above the rate which is achieved by an increase in the load alone on the engine.

6. A system according to claim 1, wherein the electrical machine comprises an electrical traction motor capable of producing driving and braking torque for the vehicle.

7. A system according to claim 1, further comprising an electrical storage battery, wherein the electrical machine is arranged to produce electrical power for recharging the battery when it produces a braking torque for the vehicle.

8. A system according to claim 1, wherein the control means has two operating modes, in only one of which the efficiency of the treating means is controlled.

9. A system according to claim 8, wherein in the other of said modes the torque produced by the engine and the electrical machine are controlled so as to optimise the fuel efficiency of the powertrain.

10. A system according to claim 8, wherein the control means is arranged to switch between said modes in response to changes in at least one driving parameter of the vehicle.

11. A system according to claim 10, wherein the driving parameter is the speed of the vehicle.

12. A system according to claim 1, the engine comprising a compression ignition engine.

13. A method of controlling the temperature of a catalytic converter in a parallel hybrid vehicle, the vehicle comprising:
   an engine for producing driving torque for the vehicle;
   an electrical machine capable of producing driving or braking torque for the vehicle, said engine and said electrical machine collectively forming a powertrain for the vehicle;
   an exhaust system including treating exhaust gases from the engine, the efficiency of the treating means being at least partially dependent on the temperature of the exhaust gases;
   sensing means for sensing the temperature of at least one place in the exhaust system; and control means arranged to monitor the temperature sensed by the sensing means and to control the torque produced by the electrical machine and the engine in response to said sensed temperature so as to control the efficiency of the treating means whilst maintaining the desired output torque form the powertrain, the method including temporarily increasing the torque produced by the electrical machine if the temperature sensed by the sensing means indicated that the treating means is at a temperature above a desired working temperature so as to temporarily decrease the load on the engine, such that the method includes lowering the temperature of said exhaust gases in order to maintain the desired output torque from the powertrain despite a cool down of the treating means.

14. A method according to claim 13, including increasing the torque produced by the electrical machine by controlling the electrical machine to temporarily decrease the braking torque or increase the driving torque it produces.

15. A method according to claim 13, the vehicle further comprising an electrical storage battery connected to the electrical machine, the method including drawing power from the battery for the electrical machine in order to increase the driving torque provided by said electrical machine.

16. A method according to claim 13, including decreasing the driving torque or increasing the braking torque that the electrical machine produces, if the temperature sensed by the sensing means indicates that the treating means is at a temperature below a desired working temperature, so as to temporarily increase the load on the engine, whereby the method includes increasing the temperature of said exhaust gases in order to heat up the treating means.

17. A method according to claim 16, the vehicle further comprising an electrical storage battery, the method including providing power to a heater of the treating means during a period when the control means has temporarily decreased the driving torque or increased the braking torque produced by the electrical machine, so that the method includes increasing the rate at which the treating means is heated up to a rate above the rate which is achieved by an increase in the load alone on the engine.

18. A method according to claim 13, the vehicle further comprising an electrical storage battery, the method including producing electrical power for recharging the battery when the electrical machine produces a braking torque for the vehicle.

19. A method according to claims 13, including operating the control means in two operating modes, in only one of which the method includes controlling the efficiency of the treating means.

20. A method according to claim 19, including controlling the production of torque by the engine and the electrical machine in the other of said modes so as to optimise the fuel efficiency of the powertrain.

21. A method according to claim 20, including switching between said modes in response to changes in at least one driving parameter of the vehicle.

22. A method according to claim 21, wherein the driving parameter is the speed of the vehicle.

23. A control system to maintain an optimum desired temperature in a catalytic converter in a parallel hybrid vehicle, the control system comprising:

a powertrain producing a desired output torque via a ratio of an engine producing driving torque for the vehicle, in parallel combination with an electrical generator capable of producing one of driving and braking torque for the vehicle;

an exhaust system including treating means for treating exhaust gases from the engine, the treating means having an efficiency being at least partially dependent on the temperature of the exhaust gases;

sensing means for sensing the temperature of at least one place in the exhaust system;

a control means which, for each desired output torque from the powertrain, varies a ratio of the relative torques produced by the electrical generator and the engine based on the temperature sensed by the sensing means to effect a desired optimum temperature of the catalytic converter and sustain efficiency of the treating means while maintaining the desired output torque from the powertrain; and the control means temporarily increasing the torque produced by the electrical generator to facilitate a temporary decrease of the load on the engine when the sensing means indicates the treating means is at a temperature above the desired optimum temperature for efficiency in order to lower the temperature of the exhaust gases while preserving the desired output torque from the powertrain despite the decrease in relative torque produced by the engine.

* * * * *